US012641498B2

(12) United States Patent
Zhang et al.

(10) Patent No.: US 12,641,498 B2
(45) Date of Patent: May 26, 2026

(54) SYNCHRONIZATION FOR LOW-LAYER BASED MOBILITY MANAGEMENT

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Fangli Xu, Beijing (CN); Haijing Hu, Los Gatos, CA (US); Haitong Sun, Cupertino, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 17/593,495

(22) PCT Filed: May 14, 2020

(86) PCT No.: PCT/CN2020/090264
§ 371 (c)(1),
(2) Date: Sep. 20, 2021

(87) PCT Pub. No.: WO2021/226934
PCT Pub. Date: Nov. 18, 2021

(65) Prior Publication Data
US 2022/0312286 A1 Sep. 29, 2022

(51) Int. Cl.
*H04W 36/00* (2009.01)
*H04W 74/0833* (2024.01)

(52) U.S. Cl.
CPC . *H04W 36/0061* (2013.01); *H04W 36/00725* (2023.05); *H04W 74/0841* (2013.01)

(58) Field of Classification Search
None
See application file for complete search history.

(56) References Cited

U.S. PATENT DOCUMENTS

2018/0359299 A1 12/2018 Chou
2020/0260500 A1* 8/2020 Agiwal ............ H04W 28/0278
(Continued)

FOREIGN PATENT DOCUMENTS

CN 110167091 8/2019
CN 111066292 4/2020
(Continued)

OTHER PUBLICATIONS

Qualcomm (R1-1705573)—Mobility procedure consideration, Apr. 3-7, 2017 (Year: 2017).*
ZTE Corporation et al., "2-step RACH HO instead of RACH-less HO"; 3GPP TSG RAN WG2 Meeting #106; R2-1907088; May 17, 2019; 6 sheets.
Huawei et al., "Considerations on mobility management in NTN"; 3GPP TSG-RAN WG2 Meeting #104; R2-1818248; Nov. 16, 2018; 4 sheets.
(Continued)

*Primary Examiner* — The Hy Nguyen
(74) *Attorney, Agent, or Firm* — Fay Kaplun & Marcin, LLP

(57) ABSTRACT
The disclosure is related to handover methods in a wireless network. A user equipment (UE) may connect to a first next generation Node B (gNB) of a 5G new radio (NR) network. The UE may then receive a handover command from the first gNB via one of a Layer 1 signaling or Layer 2 signaling that instructs the UE to perform a handover procedure to handover to a second gNB. The UE may then conduct the handover procedure with the second gNB for the UE to connect to the second gNB. Correspondingly, the first gNB may instruct the UE to perform a handover procedure based on a handover command that is transmitted from the first gNB via one of a Layer 1 signaling or Layer 2 signaling, wherein the handover command comprises an identification of a Transmission and Configuration Indication (TCI) state that is associated with the second gNB.

15 Claims, 4 Drawing Sheets

(56) References Cited

U.S. PATENT DOCUMENTS

| | | | |
|---|---|---|---|
| 2020/0314664 A1* | 10/2020 | Zhou | H04L 5/005 |
| 2020/0314708 A1* | 10/2020 | Jassal | H04W 72/046 |
| 2020/0314858 A1* | 10/2020 | Xu | H04W 72/21 |
| 2021/0051667 A1 | 2/2021 | Yang et al. | |
| 2021/0195513 A1* | 6/2021 | Zhang | H04W 24/10 |
| 2021/0377828 A1* | 12/2021 | Tao | H04W 36/0058 |
| 2021/0378045 A1* | 12/2021 | Zhang | H04W 76/25 |
| 2022/0015131 A1* | 1/2022 | Cheng | H04L 5/0055 |
| 2022/0124658 A1* | 4/2022 | Beale | H04W 24/10 |
| 2022/0124751 A1* | 4/2022 | Matsumura | H04L 5/0094 |
| 2022/0150975 A1* | 5/2022 | Agiwal | H04W 74/004 |
| 2023/0092905 A1* | 3/2023 | Zhang | H04L 5/0048 |
| | | | 370/331 |
| 2023/0096215 A1* | 3/2023 | Cao | H04L 5/0053 |
| | | | 370/329 |
| 2023/0096338 A1* | 3/2023 | Koskela | H04W 72/232 |
| | | | 370/331 |

FOREIGN PATENT DOCUMENTS

| | | | | |
|---|---|---|---|---|
| EP | 3544218 | 9/2019 | | |
| WO | WO-2019000544 A1 * | 1/2019 | ........... | H04W 72/12 |
| WO | 2019/245329 | 12/2019 | | |
| WO | 2021/159351 | 8/2021 | | |

OTHER PUBLICATIONS

China Telecommunications et al., "Add measurements for SSB beam switch";3GPP TSG-SA5 Meeting #129-e; S5-201325; Mar. 4, 2020; 4 sheets.

Apple, "CA based HO"; 3GPP TSG-RAN WG2 Meeting #105; R2-1901842; Feb. 15, 2019; 2 sheets.

3rd Generation Partnership Project; Technical Specification Group Radio Access Network, "NR and NG-RAN Overall Description" Stage 2 (Release 16); 3GPP TS 38.300, V16.2.0; Apr. 8, 2020; 151 sheets.

* cited by examiner

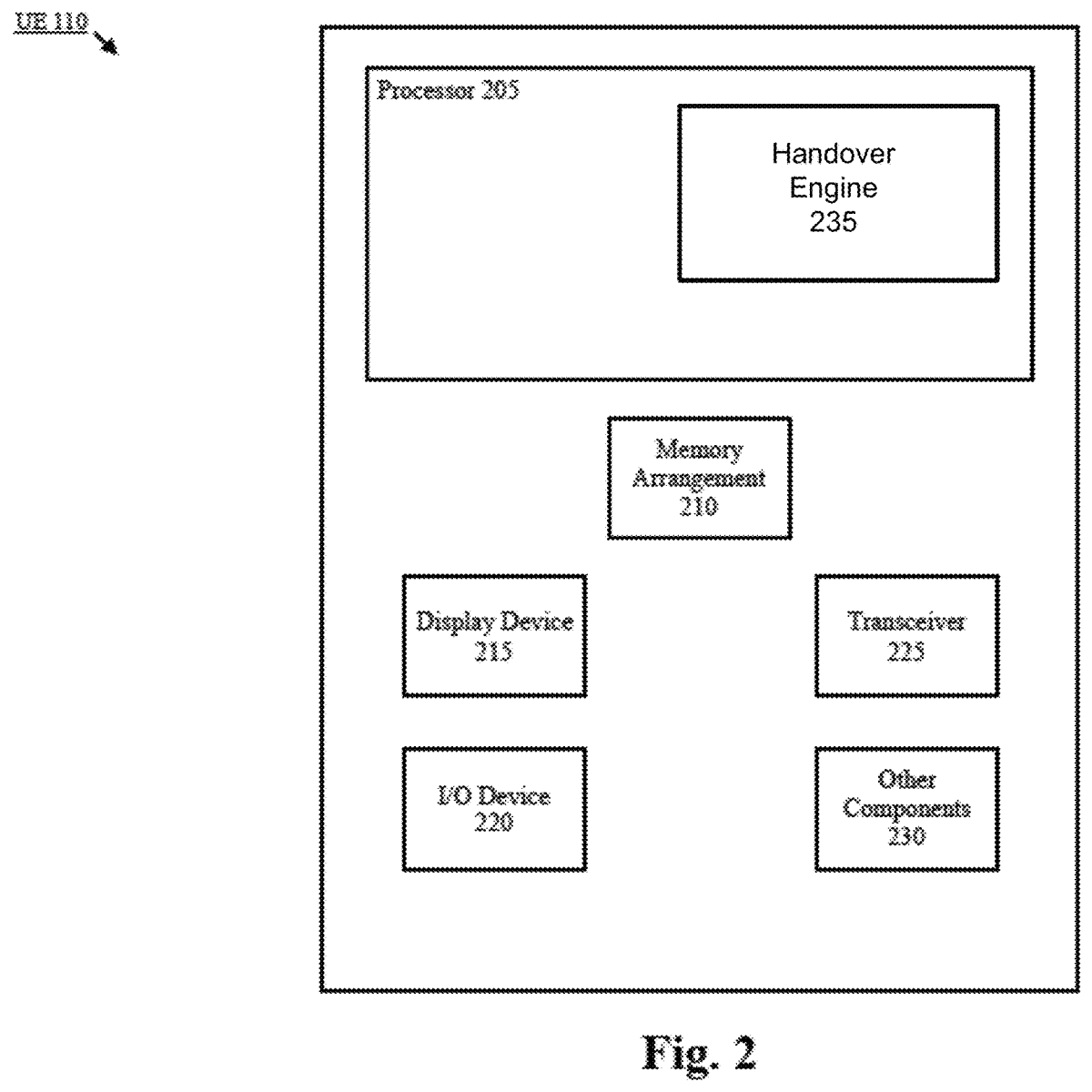

UE 110

Processor 205

Handover
Engine
235

Memory
Arrangement
210

Display Device
215

Transceiver
225

I/O Device
220

Other
Components
230

Fig. 2

SYNCHRONIZATION FOR LOW-LAYER BASED MOBILITY MANAGEMENT

BACKGROUND

A user equipment (UE) may establish a connection to at least one of multiple different networks or types of networks. The UE may establish this connection by connecting to a base station (e.g., large cell, small cell, access point, etc.) of a network. As a UE moves, the UE may have to switch from a first base station to a second base station to maintain the connection to the network. This switching from a first base station to a second base station is referred to as a handover, e.g., the first base station is handing the UE over to the second base station.

In Rel. 15 and 16 of the 3GPP standards handovers are controlled based on Radio Resource Control (RRC) signaling between the base stations and the UE. Those skilled in the art will understand that the RRC protocol is an Internet Protocol (IP) level layer or a Layer 3 protocol.

SUMMARY

Some exemplary embodiments are related to a user equipment (UE) having a transceiver and a baseband processor. The transceiver is configured to connect to a first next generation Node B (gNB) of a 5G new radio (NR) network. The baseband processor is configured to receive a handover command from the first gNB via one of a Layer 1 signaling or Layer 2 signaling that instructs the UE to perform a handover procedure to handover to a second gNB, and conduct the handover procedure with the second gNB for the UE to connect to the second gNB.

Other exemplary embodiments are related to a computer readable storage medium having a set of instructions, which when executed by a processor cause the processor to perform operations. The operations include receiving a handover command from a first next generation Node B (gNB) of a 5G new radio (NR) network via one of a Layer 1 signaling or Layer 2 signaling, the handover instructing a user equipment (UE) to perform a handover procedure to handover to a second gNB and conducting the handover procedure with the second gNB.

Still other exemplary embodiments are related to a first next generation Node B (gNB) of a 5G new radio (NR) network that has a transceiver and a baseband processor. The transceiver is configured to connect to a user equipment (UE). The baseband processor is configured to instruct the UE to perform a handover procedure from the first gNB to a second gNB based on a handover command that is transmitted from the first gNB via one of a Layer 1 signaling or Layer 2 signaling, wherein the handover command comprises an identification of a Transmission and Configuration Indication (TCI) state that is associated with the second gNB.

BRIEF DESCRIPTION OF THE DRAWINGS

FIG. 2 shows an exemplary UE according to various exemplary embodiments.

DETAILED DESCRIPTION

Figure 1:
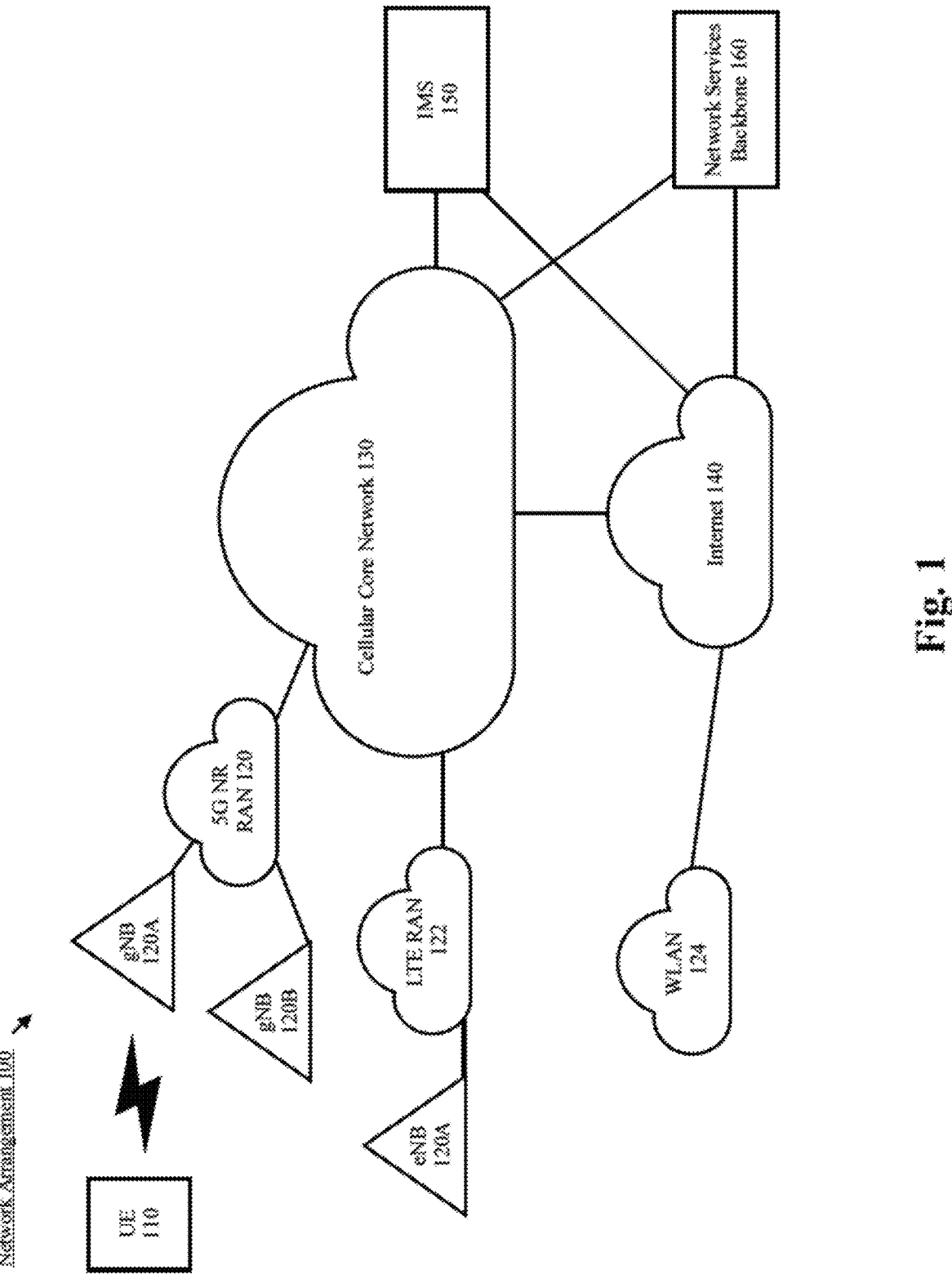
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a handover for a UE from a first base station to a second base station using lower layer (e.g., layer 1 and/or 2) signaling.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to 5G new radio (NR) radio access technology (RAT). However, it should be understood that 5G NR is being used for illustrative purposes and the exemplary embodiments may be applied to any network that exhibits the characteristics and functionalities described below for the 5G NR network.

The exemplary embodiments relate to using lower layer (e.g., layer 1 and/or 2 "L1/L2") signaling for the handover procedure. Using the lower layers for handover may reduce the latency and signaling overhead associated with the handover procedure. In general, the exemplary embodiments start the handover procedure using L1/L2 signaling from a base station. The UE receives the corresponding signaling and then synchronizes to the target cell. The exemplary embodiments address the issues of the signaling details for the L1/L2 signaling and the UE behavior to synchronize to the target cell. The exemplary embodiments will be described in detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A or the gNB 120B. The gNBs 120A and 120B may be configured with the necessary hardware, software and/or firmware to perform massive multiple in multiple out (MIMO) functionality. Massive MIMO may refer to a base station that is configured to generate a plurality of beams for a plurality of UEs. As will be described in greater detail below, the exemplary embodiments will provide manners of handing over the UE 110 from the gNB 120A to the gNB 120B, or vice versa. Reference to two gNBs 120A, 120B is merely for illustrative purposes. The exemplary embodiments may apply to any appropriate number of gNBs. Further, the UE 110 may communicate with the eNB 122A of the LTE-RAN 122 or an access point of the WLAN 124.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a handover engine 235. The handover engine 235 may be configured to manage the operation of the UE 110 during a handover procedure from the gNB 120A to the gNB 120B. The specific operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
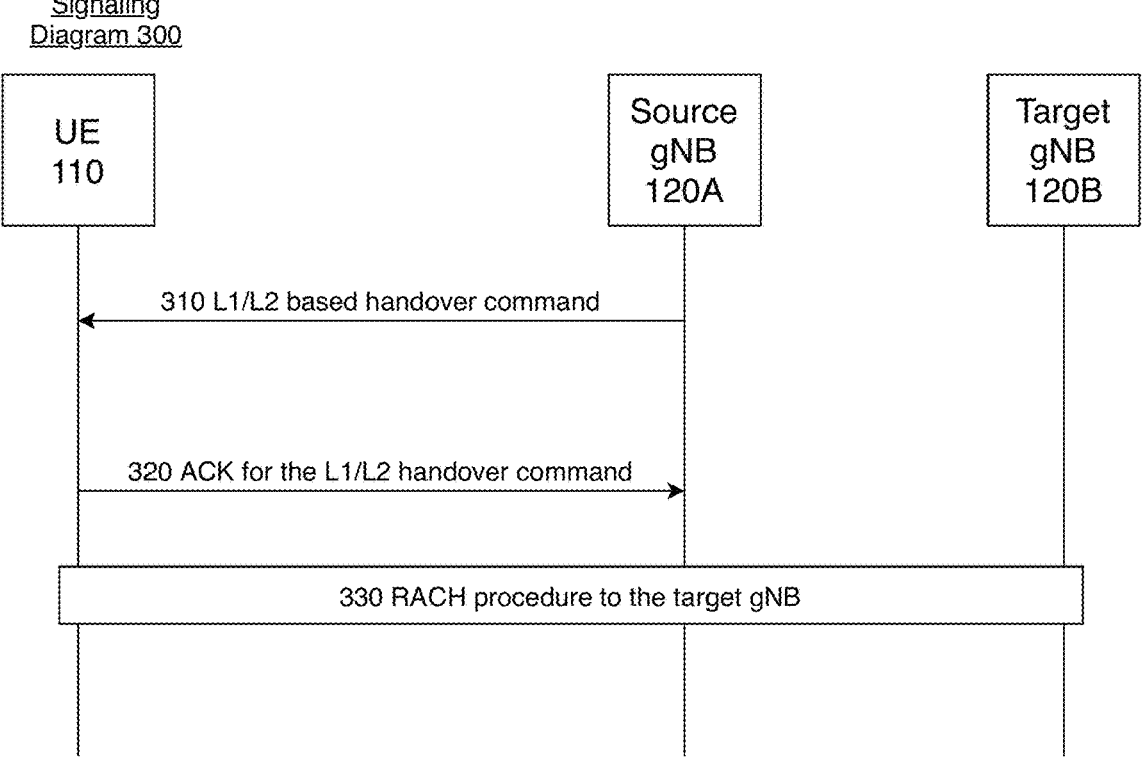
FIG. 3 shows a first exemplary signaling diagram for a Random Access Channel (RACH) based lower layer based handover command and synchronization procedure according to various exemplary embodiments.
Figure 4:
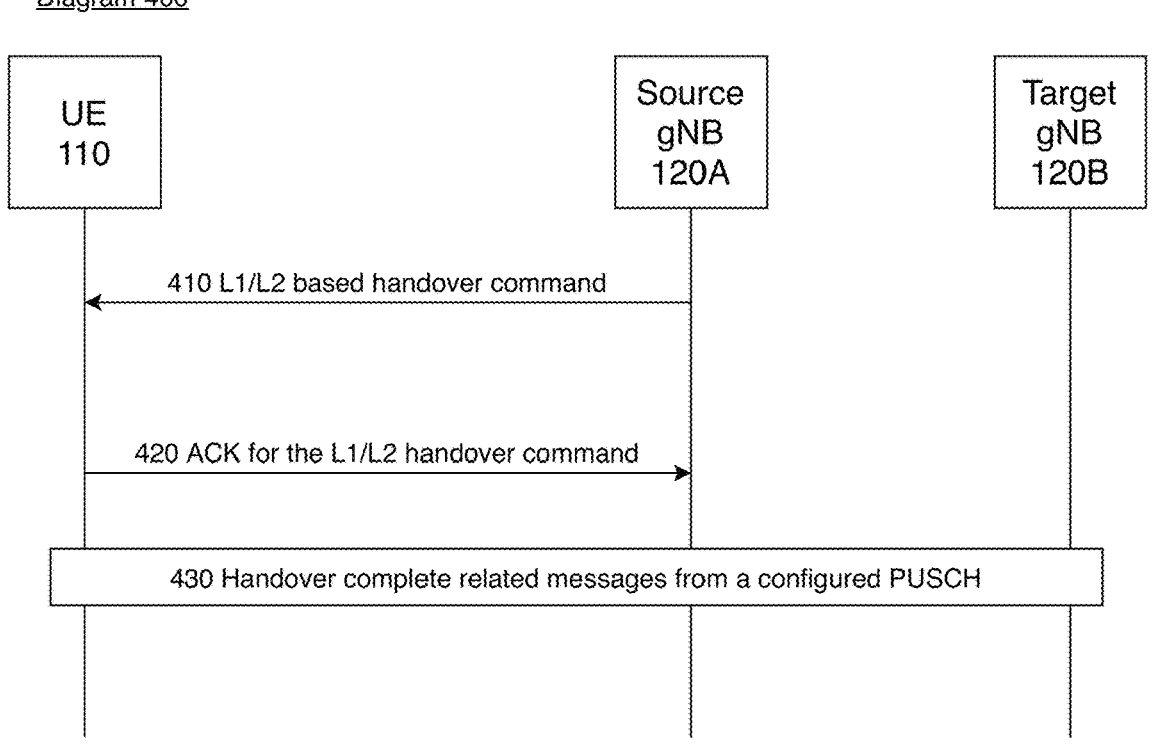
FIG. 4 shows a second exemplary signaling diagram for a RACH-less lower layer based handover command and synchronization procedure according to various exemplary embodiments.

FIGS. 3 and 4 will describe signaling associated with two examples of a lower layer based handover command and synchronization procedure. Prior to describing the signaling of FIGS. 3 and 4, it is noted that throughout this description it will be considered that the UE 110 is currently connected to the gNB 120A and the handover procedure is being performed to handover the UE to the gNB 120B. Thus, the gNB 120A will be considered the "source gNB" and the gNB 120B will be considered the "target gNB." It should be understood that this is only for illustrative purposes and any gNB may be a source gNB or a target gNB and perform the operations described herein for each of these components.

FIG. 3 shows a first exemplary signaling diagram 300 for a lower layer based handover command and synchronization procedure according to various exemplary embodiments. The signaling diagram 300 may be considered a Random Access Channel (RACH) procedure based handover.

In 310, the source gNB 120A sends a L1/L2 based handover command to the UE 110. The L1/L2 based handover command will be described in greater detail below. In 320, the UE 110 sends an ACK for the L1/L2 handover command to the source gNB 120A. While not shown in the signaling diagram 300, the UE 110 may also send the ACK for the L1/L2 handover command to the target gNB 120B. In 330, the UE 110 and the target gNB 120B perform the RACH procedure to complete the handover from the source gNB 120A to the target gNB 120B. The details of the L1/L2 based handover command and the RACH procedure will be described in greater detail below.

FIG. 4 shows a second exemplary signaling diagram 400 for a lower layer based handover command and synchronization procedure according to various exemplary embodiments. The signaling diagram 400 may be considered a RACH-less based handover.

In 410, the source gNB 120A sends a L1/L2 based handover command to the UE 110. In 420, the UE 110 sends an ACK for the L1/L2 handover command to the source gNB 120A. In 430, the UE 110 and the target gNB 120B exchange handover messages on a configured Physical Uplink Shared Channel (PUSCH) to complete the handover from the source gNB 120A to the target gNB 120B. The details of the L1/L2 based handover command and the PUSCH messaging will be described in greater detail below.

Figure 5:
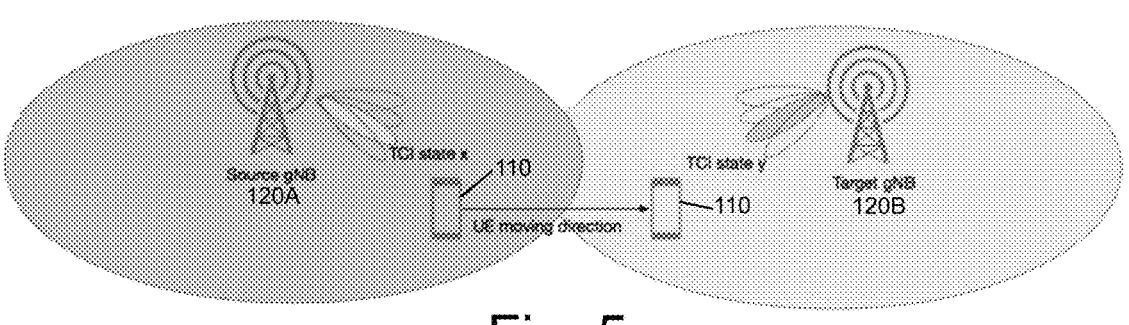
FIG. 5 shows a diagram of the UE being handed over from a source next generation NodeB (gNB) to a target gNB according to various exemplary embodiments.

FIG. 5 shows a diagram of the UE 110 being handed over from a source gNB 120A to a target gNB 120B according to various exemplary embodiments. As described above, in 310 and 410, the source gNB 120A will send a L1/L2 based handover command to the UE 110 to initiate the handover procedure. The following describes an exemplary L1/L2 based handover command that will be described with reference to FIG. 5.

The gNB to which the UE is currently connected (e.g., gNB 120A) may provide a downlink beam indication based on a Transmission and Configuration Indication (TCI). The TCI may be used to indicate the quasi-co-location (QCL) source reference signal for a downlink channel (PDSCH, PDCCH). Two antenna ports are considered to be quasi-co-located if properties of the channel over which a symbol on one antenna port is conveyed can be inferred from the channel over which a symbol on the other antenna port is conveyed. The UE 110 may be configured with a number (S) of TCI state sets. Within each TCI state set, a number (N) of TCI states may be configured. Each TCI state set may correspond to a serving cell. For example, in FIG. 5, it may be considered that TCI state x corresponds to a TCI state set for the source gNB 120A and TCI state y corresponds to a TCI state set for the target gNB 120B. This correspondence may be based on a physical cell ID (PCI) that is configured for each of the TCI state sets or each TCI state. This correspondence allows for implicit association, e.g. gNB can configure different PCIs in different TCI states, and the TCI states that share the same PCI may be considered to belong to the same set.

The L1/L2 based handover command may be based on a TCI update command that is sent from the source gNB 120A to the UE 110. For example, as described in the above example, the source gNB 120A is associated with the TCI state x and the target gNB 120B is associated with the TCI state y. Thus, in the L1/L2 based handover command, the source gNB 120A may send a TCI update command that indicates the TCI state y. Since the UE 110 is configured with information indicating that the TCI state y is associated with the target gNB 120B, the UE 110 will understand that the source gNB 120A is signaling that a handover operation should be performed to the handover to the target gNB 120B.

The L1/L2 based handover command, e.g., the TCI update command including the TCI state indication may be included in a Medium Access Control (MAC) Control Element (CE), e.g., a layer 2 message, or in a Downlink Control Information (DCI) message, e.g., a layer 1 message. The UE 110 may store various RRC parameters sets associated with different TCI state sets that may then be used for handover. Examples of this stored information will be provided below. The exemplary L1/L2 based handover command may be used in operation 310 or 410 for either the RACH based handover or the RACH-less based handover.

The following provides additional information that may be used for the RACH based handover procedure as was described above with respect to FIG. 3. For example, since a RACH procedure is being used and the candidate beam for the target cell 120B has been identified, e.g., the TCI state y, the source gNB 120A may also provide Physical RACH (PRACH) resources to UE 110 to reduce additional latency for beam measurement. A PRACH resource may indicate the preamble index and a time/frequency resource for a PRACH transmission. The UE 110 may derive the pathloss for PRACH power control based on the synchronization signal blocks (SSB)/Channel State Indication-Reference Signal (CSI-RS) configured in the TCI state.

In a first exemplary embodiment, for each TCI state, the source gNB 120A may configure a PRACH resource from the target cell 120B by RRC signaling. The RRC signaling described in this example is RRC signaling that occurs prior to the start of the handover procedure, e.g., during the normal course of RRC signaling that occurs while the UE 110 is connected to the gNB 120A. As described above, the UE 110 may store various RRC parameters sets associated with different TCI state sets. For example, as part of the TCI state information that is signaled to the UE 110, the source GNB 120A may include an indication of a PRACH resource for a TCI state. When the UE 110 receives the L1/L2 based handover command that includes a TCI state, the UE 110 can retrieve the information associated with the TCI state that includes the PRACH resource.

The UE 110 may then start the RACH procedure (e.g., operation 330 of FIG. 3) based on the configured PRACH resource. The initial attempt at the RACH procedure 330 may be a contention-free based RACH procedure. The UE 110 may monitor for a response after transmitting the PRACH, and, if after a given time window, the UE 110 does not receive any response, the UE may then fallback to use a contention-based RACH procedure. Completion of the RACH procedure 330 will complete the handover from the source gNB 120A to the target gNB 120B.

Figure 6:
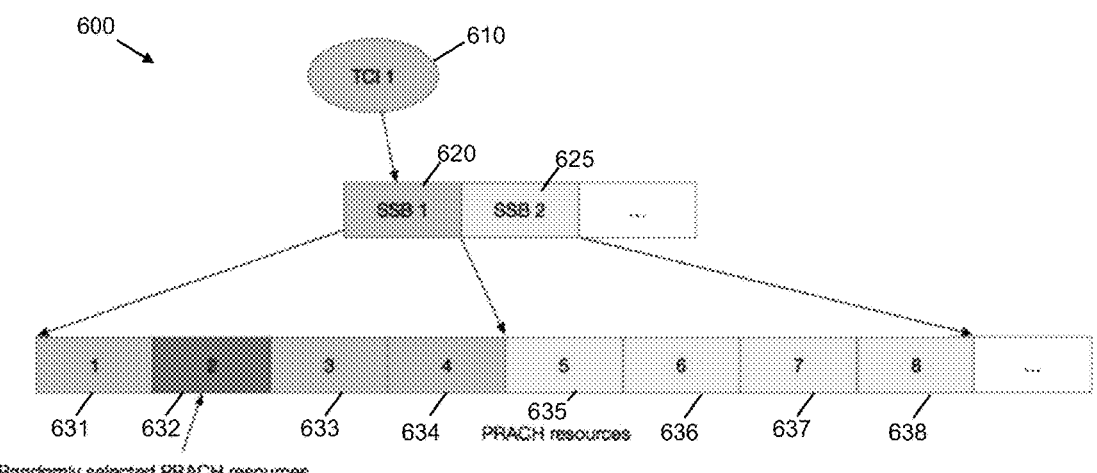
FIG. 6 shows a block diagram of a relationship between a Transmission and Configuration Indication (TCI) state, a synchronization signal block (SSB) and Physical RACH (PRACH) resources for a RACH based handover according to various exemplary embodiments.

FIG. 6 shows a block diagram 600 of a relationship between a TCI state 610, a SSBs 620, 625 and PRACH resources 631-638 for a RACH based handover according to various exemplary embodiments. In a second exemplary embodiment of the RACH based handover, in each TCI state, the source gNB 120A may configure a SSB or CSI-RS that is QCLed with a SSB. In this example, it may be considered that the TCI state 1 610 is associated with the target gNB 120B. The SSB 620 is associated with the TCI 1 state 610 and the PRACH resources 631-634. The association between the PRACH resources 631-634 and the SSB 620 from the target cell 120B may again be configured by RRC signaling in a similar manner as was described above with reference to the TCI state information.

In this exemplary embodiment, the UE 110 may randomly select one of associated PRACH resources (e.g., PRACH resource 632) based on the SSB 620 associated with the TCI 1 state 610 of the target gNB 120B and perform a contention-based RACH procedure in 330. For example, in some embodiments, the radio network temporary ID (RNTI) of the UE 110 in the target cell may be configured for each TCI state. The UE 110 may transmit a Msg3 to the target gNB 120B that includes the RNTI. In other embodiments, the target gNB 120B may not provide the UE 110 with the new RNTI. In this case, the UE 110 may transmit a Msg3 with the initial UE-ID for collision handling.

Figure 7:
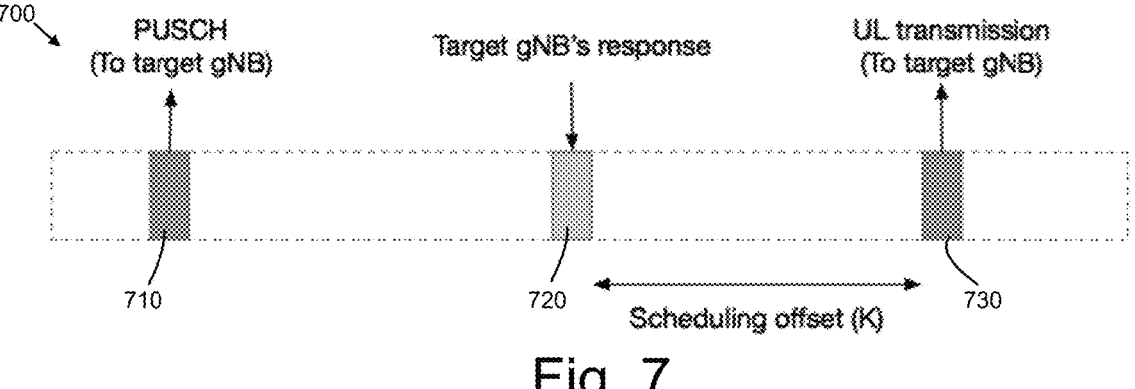
FIG. 7 shows a scheduling diagram for a RACH-less handover according to various exemplary embodiments.

The following provides additional information that may be used for the RACH-less based handover procedure as was described above with respect to FIG. 4. FIG. 7 shows a scheduling diagram 700 for a RACH-less handover according to various exemplary embodiments. The operations described with reference to scheduling diagram 700 are related to the PUSCH signaling 430 described above with reference to FIG. 4.

At 710, the UE 110 sends a PUSCH message to the target gNB 120B. The PUSCH resource that is used by the UE 110 to communicate with the target gNB 120B may be configured in various manners. In some exemplary embodiments, a PUSCH resource can be configured for each TCI state. Again, this information may be stored by the UE 110 based on RRC signaling from the source gNB 120A. The PUSCH configuration may include, a Modulation and Coding Scheme (MCS), an allocated bandwidth, time resources, DMRS port index, power control parameters, etc. The UE 110 may use the same beam to transmit the PUSCH as that to receive the SSB/CSI-RS configured in the TCI state. In addition, the UE 110 may derive the pathloss for PUSCH power control based on the SSB/CSI-RS configured in the TCI state.

In other exemplary embodiments, the PUSCH resource may be triggered by a PDCCH or MAC CE from the source gNB 120A. In one example, an indicator in the DCI may indicate whether the PDCCH is to trigger a PUSCH to the source gNB 120A or the target gNB 120B. In another example, the PUSCH resource may be indicated by the L1/L2 handover command from the source gNB 120A.

The initial scrambler of the PUSCH at 710 may be determined based on any of the configured RNTI from the source gNB 120A, an index of random access preambles or a virtual cell ID for the target gNB 120B.

The UE 110 may also derive a timing advance (TA) for the PUSCH transmission 710. There may be various options for deriving the TA. In a first example, the TA may be assumed to be 0. In a second example, the TA may be configured by the source gNB 120A. For example, the TA may be configured per TCI state set or per TCI state.

In a third example, the TA may be based on measurements of a CSI-RS configured in the TCI state. To improve the TA measurement accuracy, the CSI-RS may be configured based on one or more of the following rules. The CSI-RS may be 1-port. The frequency density for the CSI-RS may be at least x resource elements/resource block (REs/RB), e.g. x=3. The minimal bandwidth for the CSI-RS may be min{N_RB_max, N1}, where N_RB_max indicates the maximum number of RBs for the bandwidth part and N1 is a predefined value, e.g. N1=52, or based on the capability of the UE.

At 720, the target gNB 120B responds to the PUSCH message from the UE 110. The target gNB 120B response may be based on a PDCCH. As part of the response in 720, the target gNB 120B may schedule an uplink (UL) transmission with a scheduling offset K. The scheduling offset K may be determined as K2+delta, where K2 is the minimal scheduling offset and delta is the additional scheduling offset, which is predefined based on the subcarrier spacing of the PUSCH.

At 730, the UE 110 may then perform the UL transmission to the target gNB 120B. Once this is completed, the handover procedure is complete and the UE 110 is connected to the target gNB 120B.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:
   process, based on signals received from a first next generation Node B (gNB), a plurality of transmission configuration indication (TCI) state sets, wherein each TCI state set contains a plurality of TCI states, wherein each TCI state of the plurality of TCI state sets is associated with a physical random access channel (PRACH) resource and a physical cell identifier (PCI);
   process a handover command received from the first gNB via one of a Layer 1 signaling or Layer 2 signaling that instructs the apparatus to perform a handover procedure to handover to a second gNB, the handover command comprising a first TCI state from the plurality of TCI state sets, wherein the apparatus is configured with an indication of a relationship between the second gNB and a radio resource control (RRC) parameter set to be used to perform the handover procedure; and
   conduct the handover procedure with the second gNB for the apparatus to connect to the second gNB using a first PRACH resource associated with the first TCI state from the plurality of TCI state sets.

2. The apparatus of claim 1, wherein the Layer 1 signaling or Layer 2 signaling comprises one of a Medium Access Control (MAC) Control Element (CE) or a Downlink Control Information (DCI) message.

3. The apparatus of claim 1, wherein the handover procedure includes performing a Random Access Channel (RACH) procedure between the apparatus and the second gNB.

4. The apparatus of claim 1, wherein the apparatus attempts a contention-free RACH procedure on the first PRACH resource.

5. The apparatus of claim 3, wherein the apparatus performs a contention based RACH procedure on the first PRACH resource.

6. The apparatus of claim 1, wherein the handover procedure includes performing Physical Uplink Shared Channel (PUSCH) messaging between the apparatus and the second gNB.

7. The apparatus of claim 6, wherein a PUSCH resource to perform the PUSCH messaging is signaled to the apparatus from the first gNB.

8. The apparatus of claim 6, wherein the apparatus is configured to determine a timing advance (TA) for a PUSCH resource.

9. The apparatus of claim 8, wherein the TA is determined based on at least one of (i) a predetermined value, (ii) information received from the first gNB, or (iii) measurements of a Channel State Indication-Reference Signal (CSI-RS).

10. A non-transitory computer readable storage medium comprising a set of instructions, which when executed by a processor cause the processor to perform operations comprising:

process, based on signals received from a first next generation Node B (gNB), a plurality of transmission configuration indication (TCI) state sets, wherein each TCI state set contains a plurality of TCI states, wherein each TCI state of the plurality of TCI state sets is associated with a physical random access channel (PRACH) resource and a physical cell identifier (PCI);

process a handover command received from the gNB of a 5G new radio (NR) network via one of a Layer 1 signaling or Layer 2 signaling, the handover instructing a user equipment (UE) to perform a handover procedure to handover to a second gNB, the handover command comprising a first TCI state from the plurality of TCI state sets, the processor is configured with an indication of a relationship between the second gNB and a radio resource control (RRC) parameter set to be used to perform the handover procedure; and conducting the handover procedure with the second gNB using a first PRACH resource associated with the first TCI state from the plurality of TCI state sets.

11. The non-transitory computer readable storage medium of claim 10, wherein the handover procedure includes performing a Random Access Channel (RACH) procedure between the UE and the second gNB.

12. The non-transitory computer readable storage medium of claim 11, wherein the operations further comprise:

attempting a contention-free RACH procedure with the second gNB on the first PRACH resource.

13. The non-transitory computer readable storage medium of claim 10, wherein the handover procedure includes performing Physical Uplink Shared Channel (PUSCH) messaging between the UE and the second gNB.

14. A method performed by a user equipment (UE), comprising:

connecting to a first next generation Node B (gNB) of a 5G new radio (NR) network;

receiving, from the first gNB, a plurality of transmission configuration indication (TCI) state sets, wherein each TCI state set contains a plurality of TCI states, wherein each TCI state of the plurality of TCI state sets is associated with a physical uplink shared channel (PUSCH) resource and a physical cell identifier (PCI);

receiving a handover command from the first gNB via one of a Layer 1 signaling or Layer 2 signaling that instructs the UE to perform a random access channel (RACH)-less handover procedure to handover to a second gNB, the handover command comprising a first TCI state from the plurality of TCI state sets, wherein the UE is configured with an indication of a relationship between the second gNB, the identified TCI state and an radio resource control (RRC) parameter set to be used to perform the handover procedure; and conducting the RACH-less handover procedure with the second gNB for the UE to connect to the second gNB, wherein the RACH-less handover procedure including transmitting a PUSCH message on a first PUSCH resource associated with the first TCI state of the plurality of TCI state sets.

15. The method of claim 14, wherein the Layer 1 signaling or Layer 2 signaling comprises one of a Medium Access Control (MAC) Control Element (CE) or a Downlink Control Information (DCI) message.

* * * * *